(12) United States Patent
O'Sullivan et al.

(10) Patent No.: US 9,685,823 B2
(45) Date of Patent: Jun. 20, 2017

(54) METHOD FOR CALIBRATING SENSORS IN A POWER SYSTEM

(75) Inventors: Charles Brendan O'Sullivan, Castletroy (IE); Michael Anthony McCormack, Newmarket on Fergus (IE)

(73) Assignee: General Electric Company, Schenectady, NY (US)

( * ) Notice: Subject to any disclaimer, the term of this patent is extended or adjusted under 35 U.S.C. 154(b) by 1243 days.

(21) Appl. No.: 13/436,803

(22) Filed: Mar. 30, 2012

(65) Prior Publication Data

US 2013/0262012 A1    Oct. 3, 2013

(51) Int. Cl.
*H02J 13/00* (2006.01)
*H02J 3/00* (2006.01)

(52) U.S. Cl.
CPC ...... *H02J 13/0062* (2013.01); *H02J 13/0079* (2013.01); *H02J 2003/007* (2013.01); *Y02E 60/76* (2013.01); *Y02E 60/7838* (2013.01); *Y04S 40/124* (2013.01); *Y04S 40/22* (2013.01)

(58) Field of Classification Search
CPC ............... H02J 13/0062; H02J 13/0079; H02J 2003/007; Y02E 60/7838; Y02E 60/76; Y04S 40/22; Y04S 40/124
See application file for complete search history.

(56) References Cited

U.S. PATENT DOCUMENTS

| | | | | |
|---|---|---|---|---|
| 4,689,752 A | * | 8/1987 | Fernandes | G01K 1/024 340/538 |
| 2007/0239373 A1 | * | 10/2007 | Nasle | G06F 17/5009 702/58 |
| 2009/0319093 A1 | * | 12/2009 | Joos | H02J 3/14 700/297 |
| 2010/0076835 A1 | * | 3/2010 | Silverman | G06Q 10/06 705/14.33 |

FOREIGN PATENT DOCUMENTS

| | | |
|---|---|---|
| WO | 2004068151 | 8/2004 |
| WO | 2005119277 | 12/2005 |
| WO | 2007135162 | 11/2007 |

\* cited by examiner

*Primary Examiner* — Mischita Henson
(74) *Attorney, Agent, or Firm* — Parks IP Law LLC

(57) ABSTRACT

A system that includes a controller configured to receive data corresponding to at least a portion of a power system and one or more sensor measurements from one or more sensors in the power system. The controller may then generate a model of the power system based on at least a portion of the data and at least a portion of the sensor measurements such that the model may include one or more model measurements that correspond to the sensor measurements. After generating the model of the power system, the controller may determine one or more correction factors for the sensor measurements based on at least a portion of the sensor measurements and the model measurements, apply the correction factors to the sensor measurements to generate corrected sensor measurements, and determine one or more properties of the power system based on the corrected sensor measurements.

15 Claims, 4 Drawing Sheets

METHOD FOR CALIBRATING SENSORS IN A POWER SYSTEM

BACKGROUND OF THE INVENTION

The subject matter disclosed herein relates to a power system, and more particularly, to calibrating sensors on a power system.

Utility and industrial power systems generally use line-mounted sensors to measure a voltage of a corresponding power line. Generally, these sensors measure the voltage of its respective power line using a capacitive divider method. To use the capacitive divider method, an outer shield or section of the sensor is treated as a first plate of a capacitor (i.e., an outer sensor plate), while earth ground is treated as a second plate of the capacitor such that an effective capacitance (i.e., $C_b$) exists between the two plates. The outer sensor plate is also capacitively coupled to the conductor itself such that an effective capacitance (i.e., $C_a$) exists between the conductor and the outer sensor plate. The combination of $C_a$ and $C_b$ form a voltage divider that effectively divides the voltage of the respective power line and results in a lower potential at the node formed between $C_a$ and $C_b$, which is further processed to determine a line or phase voltage.

Although the capacitive divider method yields a low cost solution for measuring line voltage, the value of $C_b$ can be affected by several factors including soil moisture level, snow, changes in vegetation, and the like, while an effective impedance associated with $C_a$ can be affected by moisture, pollution, ice build-up, and the like. As such, the voltage measurements acquired from these sensors may not reflect accurate voltage levels on the respective lines.

BRIEF DESCRIPTION OF THE INVENTION

In one embodiment, a system may include a controller configured to receive data corresponding to at least a portion of a power system and one or more sensor measurements from one or more sensors in the power system. The controller may then generate a model of the power system based on at least a portion of the data and at least a portion of the sensor measurements such that the model may include one or more model measurements that correspond to the sensor measurements. After generating the model of the power system, the controller may determine one or more correction factors for the sensor measurements based on at least a portion of the sensor measurements and the model measurements, apply the correction factors to the sensor measurements to generate corrected sensor measurements, and determine one or more properties of the power system based on the corrected sensor measurements.

In a second embodiment, a sensor may include a controller configured to send a first set of one or more sensor measurements from the sensor to a data processing station. The controller may then receive one or more correction factors for the sensor measurements. The correction factors may be determined based on a model of a power system that is generated based on at least a portion of data corresponding to at least a portion of the power system and at least a portion of a second set of sensor measurements. After receiving the correction factors, the controller may apply the correction factors to the sensor measurements to generate corrected sensor measurements for determining one or more properties of the power system.

In a third embodiment, a non-transitory computer-readable medium having computer executable code stored thereon may include instructions for receiving data corresponding to at least a portion of a power system and receiving one or more sensor measurements from one or more sensors in the power system. After receiving the data and the sensor measurements, the instructions may include generating a model of the power system based on at least a portion of the data and at least a portion of the sensor measurements. The model of the power system may include one or more model measurements that correspond to the sensor measurements. After generating the model, the instructions may include determining one or more correction factors for the sensor measurements based on at least a portion of the sensor measurements and the model measurements and sending the correction factors to the sensors.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally related to calibrating sensors that in a power system. In one embodiment, a controller in a power station may receive information associated with the power system connected thereto. The power system information may include accuracy data related to each sensor in the power system, location data that describe the location of each sensor with respect to the power system, configuration data that describe the structure of the power system, and the like. In addition to the power system information, the controller in the power station may receive raw measurement data from each sensor in the power system. Using the power system information and the raw measurement data, the controller in the power station may model the power system and simulate a number of voltage values for a number of nodes at various locations in the power system. The controller may additionally then determine correction or calibration factors for the sensors in the power system based on the simulated voltage values for the power system. The controller may additionally send the correction factors to each sensor in the power system, such that each sensor may apply its respective correction factor to its raw measurement data. In this manner, the sensors may correct its measurement data, which may be negatively affected by various environmental factors.

Figure 1:
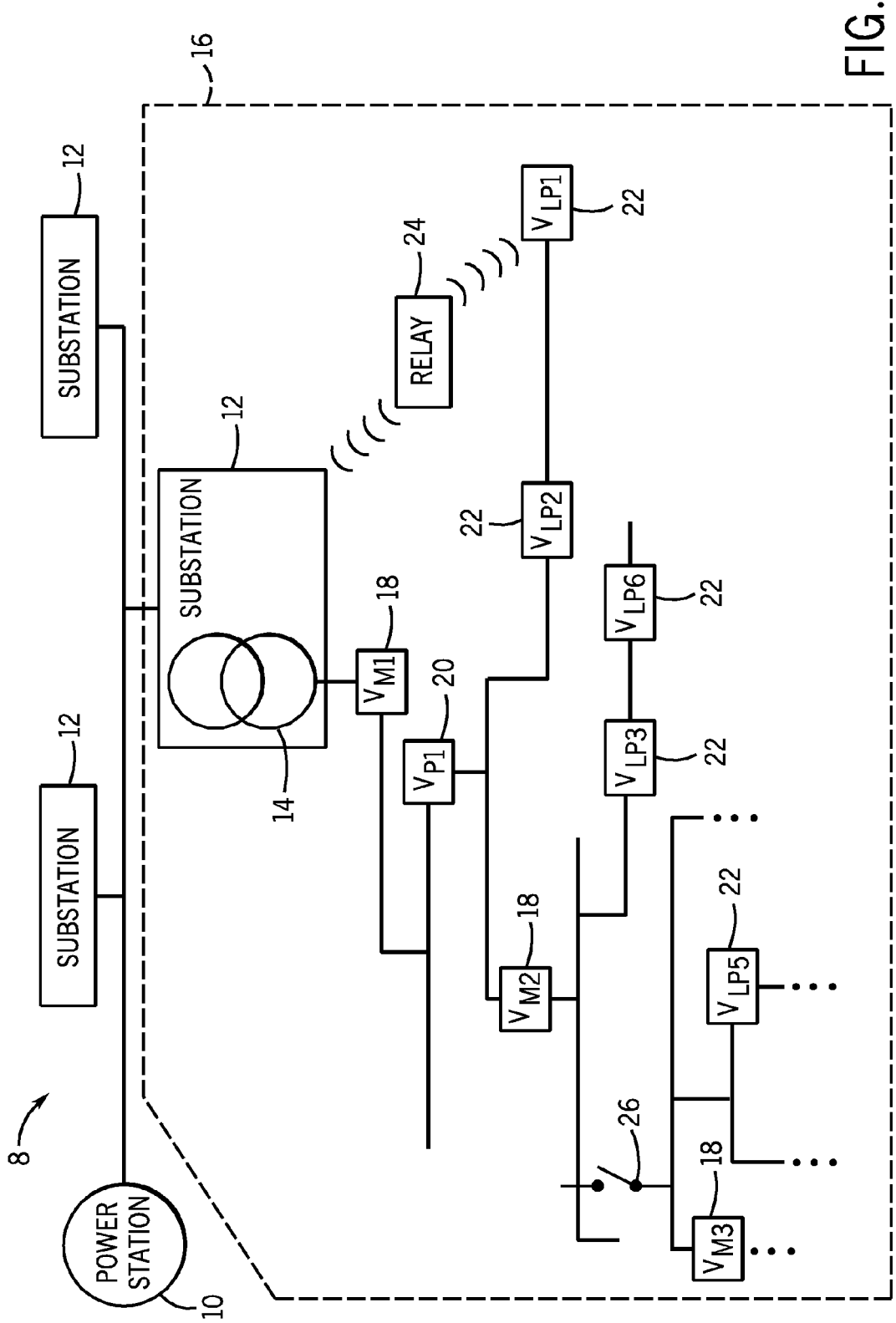
FIG. 1 depicts a schematic diagram of an embodiment of a power system.

Referring to FIG. 1, a power system 8 may include a power station 10, a substation 12, or the like. The power station 10 may generate electrical power to be provided to one or more substations 12 coupled to the power station 10. The substations 12 may distribute the electrical power from the power station 10 downstream to connected loads. In one embodiment, the power station 10 may provide medium voltage on the power system 8. Each of the substations 12 may include a transformer 14 that may transform the high voltage levels provided by the power station 10 into lower voltage levels that may be distributed to the connected loads. In one embodiment, the substation 12 may be part of a network topology 16 that distributes the power from the substation 12 to the connected loads.

The network topology 16 may include different types of sensors such as pole-mounted combination (voltage/current) sensors 18, pole-mounted voltage sensors 20, line-mounted voltage sensors 22, and the like. These sensors may be capable of measuring a voltage, current, phase, frequency, line droop angle, line acceleration, line temperature, and other parameters of its corresponding power line in real time. Additionally, the sensors 18, 20, and 22 may be capable of communicating with each other, the power station 10, the substation 12, or a relay 24 using wired or wireless communication networks as will be discussed with reference to FIG. 2.

Figure 2:
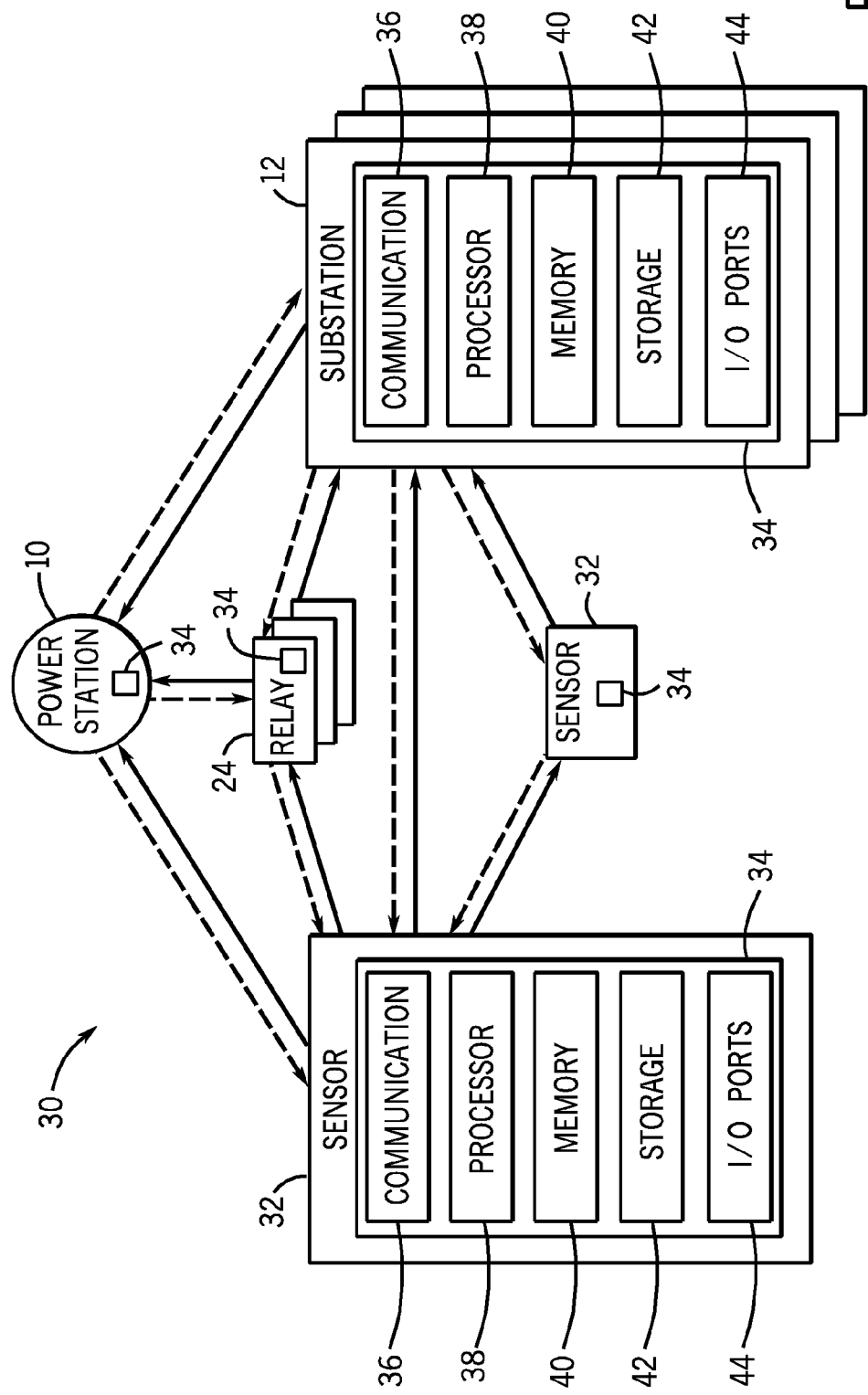
FIG. 2 depicts a block diagram of an embodiment of a communication network within the power system of FIG. 1.

Additionally, the network topology 16 may also include a switch 26, which may be used to disconnect downstream components from the corresponding substation 12. In one embodiment, like the sensors described above, the switch 26 may be capable of communicating its position (i.e., open or closed) with the sensors 18, 20, and 22, the power station 10, the substation 12, and/or the relay 24 using wired or wireless communication networks, as illustrated in FIG. 2. The position of the switch may indicate to the sensors 18, 20, and 22, the power station 10, the substation 12, or the relay 24 the electrical topology of the power system 8.

FIG. 2 depicts an example of a communication network 30 that may be used in the power system 8. The communication network 30 may facilitate communication between a power station 10, one or more substations 12, one or more relays 24, and/or one or more sensors 32. In one embodiment, the power station 10, the substations 12, the relays 24, and the sensors 32 may each include a controller 34. The controller 34 may include a communication module 36, a processor 38, a memory 40, a storage 42, input/output (I/O) ports 44, and the like.

The communication module 36 may be a wireless or wired communication module that may facilitate communication between the power station 10, the substations 12, the relays 24, and/or the sensors 32. The processor 38 may be any type of computer processor or microprocessor. The memory 40 and the storage 42 may be configured to store computer executable code that may be used by the processor 38 to perform the presently disclosed techniques. In one embodiment, the memory 40 and/or the storage 42 may be a non-transitory computer-readable medium.

The sensors 32 may include the pole-mounted combination sensors 18, the pole-mounted voltage sensors 20, the line-mounted voltage sensors 22, current transformers, substation instrumentation transformers, distributed equipment (e.g., instrumented capacitor banks), or the like. In one embodiment, the sensors 32 may receive the measurements via the I/O ports 44 such that it may be processed by the processor 38. The measurements may also be transmitted to other sensors 32, relays 24, substations 12 or power station 10 via communication module 34, which may enable the processor 38 to process the measurements in real time. Alternatively, the measurements may be stored in storage 42 such that it may be processed at a later time.

In one embodiment, the sensors 32 may measure the voltage of its respective line using effective capacitances $C_a$ (i.e., between the conductor and an outer plate of the sensor) and $C_b$ (i.e., between the outer sensor plate and earth ground), as described above. Similarly, the sensors may measure the current of its respective line using effective impedances associated with $C_a$ and $C_b$. These measurements may be used for a variety of applications including, but not limited to, identifying a fault location in the network topology 16, determining a distance to the fault location, performing high impedance earth fault sensing, making phasor measurement unit (PMU) based fault analysis, calculating a volt-ampere-reactive (VAR) measurement, issuing VAR control/capacitor bank switching/voltage control commands, making power or power flow measurement, and the like. Moreover, since many of these applications (e.g., the identification of a fault location) are time sensitive matters, it is important that the short term accuracy of the measurements acquired by the sensors 32 is reliable.

Although the sensors 32 are capable of measuring a voltage, current, phase, frequency, line droop angle, line acceleration, line temperature, and other parameters in real time, there may be a significant amount of uncertainty in their voltage and current measurements due to various environmental influences. For instance, as mentioned above, the effective value of $C_b$ may be affected by soil moisture level, snow, changes in vegetation, and the like in the environment surrounding the sensor, and the effective impedance associated with $C_a$ may be affected by moisture, pollution, ice buildup, and the like on the sensor's enclosure. In this manner, the measurements of the sensors 32 may vary over time due to variations in local conditions both in the environment near the sensor 32 and on the enclosure of the sensor 32, which may result in unreliable and inaccurate measurements of the sensors 32.

Although the measurements of the sensors 32 may not be accurate, the linearity of the measurements of the sensors 32 is generally accurate. For instance, a 10% variation in line voltage will result in a similar 10% variation in voltage measurements of the sensors 32. As such, if the measurements of the sensors 32 are calibrated at some point in time, the measurements of the sensors 32 after the calibration may be accurate. Thus, to obtain more accurate and reliable measurements of the sensors 32, calibration or correction factors may be used to correct the measurements of the sensors 32.

In one embodiment, correction factors or calibration factors may be calculated at a system level (i.e., power system 8/network topology 16) and applied to the measurements of the sensors 32. For instance, voltage at a given point on the network topology 16 may be inferred from voltage on other points of the network topology 16 given known currents, conductor types, conductor lengths, and the like. The estimated voltages from these points may then correct or normalize the raw measurements and provide accurate transient and steady state measurements. Techniques that may be used for calibrating the raw measurements are described with more details below with reference to FIG. 3 and FIG. 4.

Figure 3:
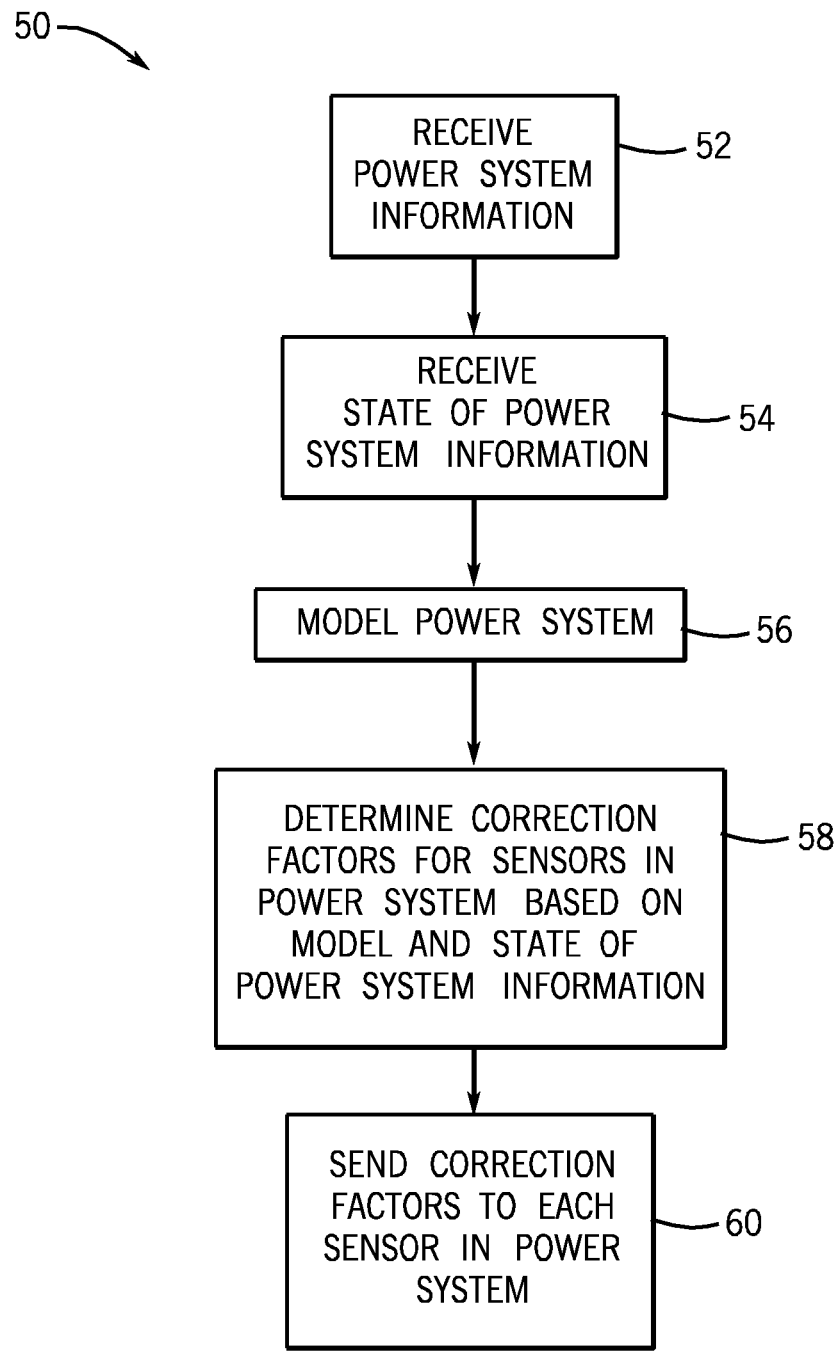
FIG. 3 depicts a flow diagram of an embodiment of a central controller that employs a method for calibrating sensors in the power system of FIG. 1.

FIG. 3 is a flow diagram 50 that provides an example of a method for calibrating sensors 32 in the power system 8. Although the flow diagram 50 indicates a particular order of operation, it should be understood that the flow diagram 50 is not limited to the illustrated order. Instead, the flow diagram 50 may be performed in any suitable order. The method for calibrating sensors 32 of FIG. 3 described in the flow diagram 50 below may be performed by the controller 34 in the power station 10. However, it should be noted that in other embodiments the method for calibrating sensors 32 of FIG. 3 may also be performed by one of the relays 24 or one of the substations 12, as described above in FIG. 2.

At block 52, the controller 34 in the power station 10 may receive information associated with the power system 8, which may include location and accuracy data of all of the sensors 32 in the power system 8. In one embodiment, the sensors 32 may be equipped to measure phase and amplitude (e.g., Phasor Measurement Units) of its corresponding position on the power system 8 using the pole-mounted combination sensors 18, the pole-mounted voltage sensors 20, line-mounted voltage sensors 22, substation instrumentation transformers, distributed equipment, or the like.

The location data may denote the location of each sensor 32 on the power system 8. The accuracy data of the sensors 32 may denote a degree of expected accuracy for the corresponding sensor 32. Some sensors 34 are generally considered to be accurate based on their type and/or their placement in the network topology 16. For instance, sensors 32 located at the substation 12 may generally be considered to be accurate because of their close proximity to the power station 10. Here, since the voltage is distributed to the substation 12 via a low-impedance electrical bus, the voltage drop between the power station 10 and the substation 12 may be small/negligible. Further, since the sensors 32 in the substation 12 may be isolated from various environmental influences (e.g., housed inside a structure containing the substation 12), the corresponding sensors 32 may acquire accurate measurements.

In addition to the location and accuracy data of all of the sensors 32 in the power system 8, the controller 34 in the power station 10 may receive information detailing the configuration of each network topology 16 in the power system 8, the location of the switches 26 in the power system 8, and any other power equipment coupled to the power system 8. In one embodiment, the information describing the network topology 16 may include the types of conductors used in the network topology 16, the lengths of the conductors, the impedances of the conductors, and the like.

Although block 52 has been described as receiving the location and accuracy data of all of the sensors 32 in the power system 8, it should be noted that the flow diagram 50 may be performed on a portion of the power system 8 such as network topology 16, a portion of network topology 16, or the like.

At block 54, the controller 34 in the power station 10 may receive information associated with a state of the power system 8. The state of the power system 8 may include a state (i.e., open or closed) of the switches 26 in the power system 8, the measurements from each sensor 32 in the power system 8, and the like. The measurements of each sensor 32 may include voltage measurements at different nodes in the power system 8 obtained from different sensors and current measurements flowing on different branches of each network topology 16 obtained from different current sensors (i.e., current transformers).

At block 56, the controller 34 in the power station 10 may model the power system 8 based on the power system information received at block 52 and the state of power system information received at block 54. In one embodiment, the controller 34 may simulate a number of voltage values for a number of nodes at various locations on the power system 8. The controller 34 may model the power system 8 using various simulation programs, which may be configured to model the power system 8 on a continuous or a quasi-continuous basis. After modeling the power system 8, the controller 34 may determine steady state voltage levels at various nodes in the power system 8. In one embodiment, the controller 34 may use known voltage levels (i.e., voltage measurements from high accuracy sensors), known currents from current transformers, known network topology factors (i.e., conductor type, conductor length, conductor impedance), and the like to estimate steady state voltages at the various nodes in the power system 8.

In one embodiment, the controller 34 in the power station 10 may determine the steady state voltage levels at the various nodes in the power system 8 at various times to produce more data that may be used to calibrate the sensors 32. The time-varied data may be used to determine how each sensor 32 reacts at different points in a power cycle.

At block 58, the controller 34 in the power station 10 may determine correction or calibration factors for the sensors 32 based on the modeled power system acquired at block 56 and the received state of power system information acquired at block 54. In one embodiment, the controller 34 may compare each steady state voltage level for each node in the power system 8 to a corresponding measurement of one of the sensors 32. Based on the difference between the steady state voltage levels and the corresponding sensors' measurements, the controller 34 may determine correction factors for the sensors 32.

After determining the correction factors for the sensors 32, the controller 34 may generate a comprehensive table of correction factors for the sensors 32. The controller 34 may then store the comprehensive table in the storage 42 such that it may be accessed by various components (e.g., power station 10, substation 12, relay 24, sensor 32, etc.) in the power system 8.

At block 60, the controller 34 in the power station 10 may send correction factors to each sensor 32. After receiving the correction factors, the sensors 32 may apply the received correction factors to its raw measurement data to generate corrected measurement data. By employing the flow diagram 50, the measurement data acquired from the sensors 32 may be synchronized with each other at a given cycle.

In one embodiment, the controller 34 may apply the correction factor to the received state of power system information instead of sending the correction factor to the sensors 32. The controller 34 may then send the corrected measurement data of the sensors 32 to an application that may further process the corrected measurement data of the sensors 32 (e.g., applications for identifying a fault location in the network topology 16 and/or a distance to the fault location).

Although the flow diagram 50 has been described as being performed by the controller 34 in the power station 10, in other embodiments, the flow diagram 50 may be performed by the controller 34 in the sensor 32. In this manner, after determining the correction factors for its own raw measurement data at block 58, the controller 34 of the sensor 32 may apply the correction factor to its own raw measurement data in addition to sending the respective correction factors to each respective sensor 32 at block 60.

Figure 4:
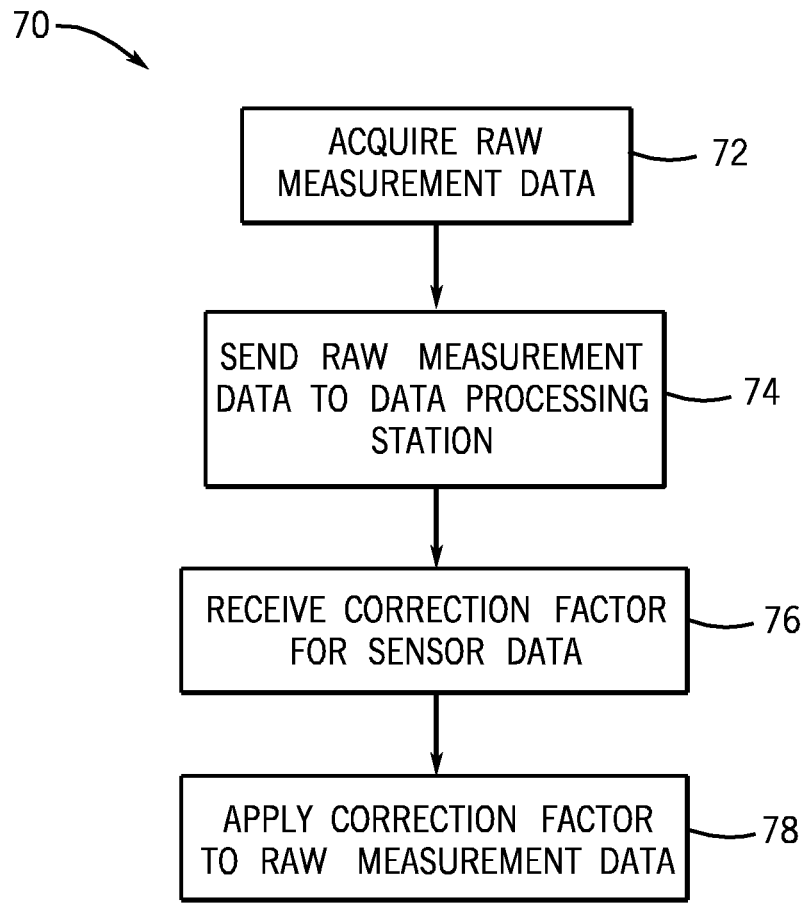
FIG. 4 depicts a flow diagram of an embodiment of a sensor controller that employs a method for calibrating sensors in the power system of FIG. 1.

FIG. 4 is a flow diagram 70 that provides an example of a method for calibrating sensors 32 in power system 8. Although the flow diagram 70 indicates a particular order of operation, it should be understood that the flow diagram 70 is not limited to the illustrated order. Instead, the flow diagram 70 may be performed in any order. In one embodiment, the process described in the flow diagram 70 may be performed by the controller 34 in the sensor 32, as described above in FIG. 2.

At block 72, the controller 34 in the sensor 32 may receive raw measurement data from the sensor 32. In one embodiment, the controller 34 may receive the raw measurement data via the I/O ports 44.

At block 74, the controller 34 in the sensor 32 may send the raw measurement data to a data processing station. The data processing station may be located at the power station 10, the substation 12, the relay 24, another sensor 32, or a remote site. In one embodiment, the controller 34 may send the raw measurement data directly to the data processing station. However, it should be noted that the controller 34 may also send the raw measurement data to the relay 24 or another sensor 32, which may then forward the raw measurement data to other relays 24, other sensors 32, and/or to the data processing station.

At block 76, the controller 34 in the sensor 32 may receive a correction factor for its raw measurement data from the data processing station. The correction factor may be determined based on the process described in FIG. 3.

After receiving the correction factor, at block 78, the controller 34 in the sensor 32 may apply the correction factor to the raw measurement data such that its data becomes corrected measurement data. As such, the corrected measurement data may more accurately reflect the corresponding characteristics of the power system 8.

Technical effects of the invention include calibrating low cost line-mounted sensors while the sensors are on-line, providing enhanced accuracy for measurements of sensors, reducing long term drift, improving the overall accuracy of line-mounted sensors, and the like. Further, by employing the methods described above, additional statistical methods may be used to further enhance the accuracy of the measurements of sensors due to the increased availability of comparison data (e.g., modeled data and sensor data). Additionally, internal anomalies such as inaccuracies in the power system model and faulty reference equipment may be minimized due to the increased availability of comparison data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power system, comprising:
a plurality of power system sensors, wherein each of the plurality of power system sensors is configured to measure a parameter corresponding to a location in a network topology of the power system, and wherein the parameter is one of voltage and current;
a controller that is configured to be communicatively connected to the plurality of power system sensors by a communication network;
wherein the controller is configured to:
access power system data corresponding to at least a portion of the power system, the power system data comprising at least one of:
the location in the network topology of the plurality of power system sensors;
a sensor type; and
an indication of accuracy of the plurality of power system sensors;
receive a plurality of sensor measurements from the plurality of power system sensors via the communication network, wherein a first one of the plurality of sensor measurements is measured by a first one of the plurality of power system sensors and a second one of the plurality of sensor measurements is measured by a second one of the plurality of power system sensors;
generate a model of the power system, wherein the model of the power system is generated based on the first one of the plurality of sensor measurements, wherein the first one of the plurality of power system sensors is determined to be accurate based on the power system data;
wherein the model generates a plurality of model measurements, wherein a second one of the plurality of model measurements corresponds to the second one of the plurality of sensor measurements; and
determine a correction factor for modifying a measurement that is measured by the second one of the plurality of power system sensors, wherein the correction factor is based on the second one of the plurality of sensor measurements and the second one of the plurality of model measurements.

2. The power system of claim 1, wherein the power system data comprising:
locations of the plurality of power system sensors in the power system;
accuracy data for the plurality of power system sensors;
one or more network topologies in the power system;
one or more locations of one or more switches in the power system;
one or more conductor types for one or more conductors in each network topology;
one or more conductor lengths for the conductors in each network topology;
one or more impedance values for the conductors in each network topology; or any combination thereof.

3. The power system of claim 1, wherein the plurality of power system sensors comprises at least one of a pole-mounted combination sensor, a pole-mounted voltage sensor, and a line-mounted voltage sensor.

4. The power system of claim 1, wherein the controller is configured to determine the correction factor based on a difference between the second one of the plurality of model measurements and the second one of the plurality of sensor measurements.

5. The power system of claim 1, the controller being configured to:
  generate a corrected sensor measurement based on the correction factor and the second one of the plurality of sensor measurements; and
  generate at least one property of the power system, wherein the at least one property of the power system comprises at least one of:
  a location of a fault in the power system;
  a volt-ampere-reactive (VAR) measurement for the power system;
  a power measurement for the power system; and
  a flow measurement for the power system.

6. The power system of claim 1, wherein the controller is configured to send the correction factor to the second one of the plurality of power system sensors that is associated with the second one of the sensor measurements.

7. The power system of claim 6, wherein the second one of the plurality of power system sensors is configured to apply the correction factor to a measurement by the second one of the plurality of power system sensors to generate a corrected sensor measurement for the second one of the plurality of power system sensors.

8. The power system of claim 1, comprising a plurality of power lines, wherein the location in the power system is one of a plurality of power lines.

9. The power system of claim 1, wherein the controller is configured to apply the correction factor to the second one of the plurality of sensor measurements to generate a corrected sensor measurement.

10. The power system of claim 9, wherein the controller is configured to determine at least one property of the power system based on the corrected sensor measurement.

11. The power system of claim 1, wherein the model of the power system includes a voltage for at least one node on the power system.

12. The power system of claim 1, wherein the first one of the plurality of power system sensors is directly coupled to a power station that is configured to generate power.

13. The power system of claim 1, wherein the first one of the plurality of power system sensors is located in a substation.

14. The power system of claim 1, wherein the second one of the plurality of power system sensors is determined to be inaccurate based on the power system data.

15. The power system of claim 1, wherein the controller is at least one of a power station controller, a substation controller, and a relay controller.

* * * * *